(12) United States Patent
Crosley

(10) Patent No.: US 8,874,429 B1
(45) Date of Patent: Oct. 28, 2014

(54) DELAY IN VIDEO FOR LANGUAGE TRANSLATION

(75) Inventor: Jay A. Crosley, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 196 days.

(21) Appl. No.: 13/475,139

(22) Filed: May 18, 2012

(51) Int. Cl.
*G06F 17/20* (2006.01)
*H04N 7/14* (2006.01)

(52) U.S. Cl.
USPC ............................................ 704/2; 348/14.08

(58) Field of Classification Search
CPC ............. G06F 17/28; H04N 7/14; H04N 7/15
USPC ............................. 704/1–8; 348/14.01–14.16
See application file for complete search history.

(56) References Cited

U.S. PATENT DOCUMENTS

| | | | |
|---|---|---|---|
| 7,054,804 B2 * | 5/2006 | Gonzales et al. ................. | 704/8 |
| 8,175,244 B1 * | 5/2012 | Frankel .................... | 379/202.01 |
| 2002/0161579 A1 * | 10/2002 | Saindon et al. ............... | 704/235 |
| 2005/0034079 A1 * | 2/2005 | Gunasekar et al. ........... | 715/753 |
| 2009/0187400 A1 * | 7/2009 | Liu et al. ............................ | 704/8 |
| 2010/0194979 A1 * | 8/2010 | Blumenschein et al. ..... | 348/468 |
| 2010/0283829 A1 * | 11/2010 | De Beer et al. ............ | 348/14.09 |
| 2011/0246172 A1 * | 10/2011 | Liberman et al. ................. | 704/2 |
| 2012/0105719 A1 * | 5/2012 | Fratti et al. .................... | 348/462 |
| 2013/0066623 A1 * | 3/2013 | Chou et al. ........................ | 704/2 |

OTHER PUBLICATIONS

File History of U.S. Appl. No. 12/463,505, filed May 11, 2009 (US Publication 2010/0283829).

\* cited by examiner

*Primary Examiner* — Samuel G Neway
(74) *Attorney, Agent, or Firm* — Thomas | Horstemeyer, LLP

(57) ABSTRACT

Disclosed are various embodiments for translation of speech in a video messaging application. A segment of streaming video is decoded to separate the visual component from the audio component. The audio component is then converted to text, which may then be translated and converted to a translation output comprising a new language. In response, the translation output may be encoded with the previously separated visual component. A delay is imposed on the visual component to account for any delays that may arise in translation. The translated video may then be streamed to participants giving the appearance of real-time video conferencing.

19 Claims, 6 Drawing Sheets

DELAY IN VIDEO FOR LANGUAGE TRANSLATION

BACKGROUND

Video messaging is becoming an optimal form of communication. Video messaging users are now able to communicate with friends, family, and colleagues all over the world at negligible costs. Yet language barriers continue to exist inhibiting the effectiveness of video messaging as a world-wide form of communication. Translation software fails to offer a real-time perception of video messaging.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed herein are various embodiments relating to language translation in a video messaging application. When a user participates in video messaging, a video feed may be shown both to the user and any other participant(s). A participant may speak in a language not understood by other participants. According to various embodiments, a video messaging application may be employed to translate the speech to a language understood by other participants.

For example, a participant in a three-way video conference using three distinct computing devices may say in English the phrase, "I will be in Seattle on Tuesday." The other two participants may not be fluent in English and may indicate a desired language as a setting in the video messaging application. One user may provide a setting requesting all communications be translated to Mandarin while the other participant requests all communications be translated to German. The respective translations may be synchronized with the visual component of the video by imposing a delay in the visual component accounting for the computation time of the translation. The German translation may only be played to the participant fluent in German, and the Mandarin translation may only be played to the participant fluent in Mandarin. This may give the appearance of a continuous, uninterrupted video conference.

In some cases, video messaging may be conducted on a computer equipped with a camera and a microphone. In other cases, mobile phone technology has advanced to where a significant number of phones have the necessary hardware, processing power, and bandwidth to participate in video messaging. In the following discussion, a general description of a system for translation in video messaging software and its components is provided, followed by a discussion of the operation of the same.

Figure 1:
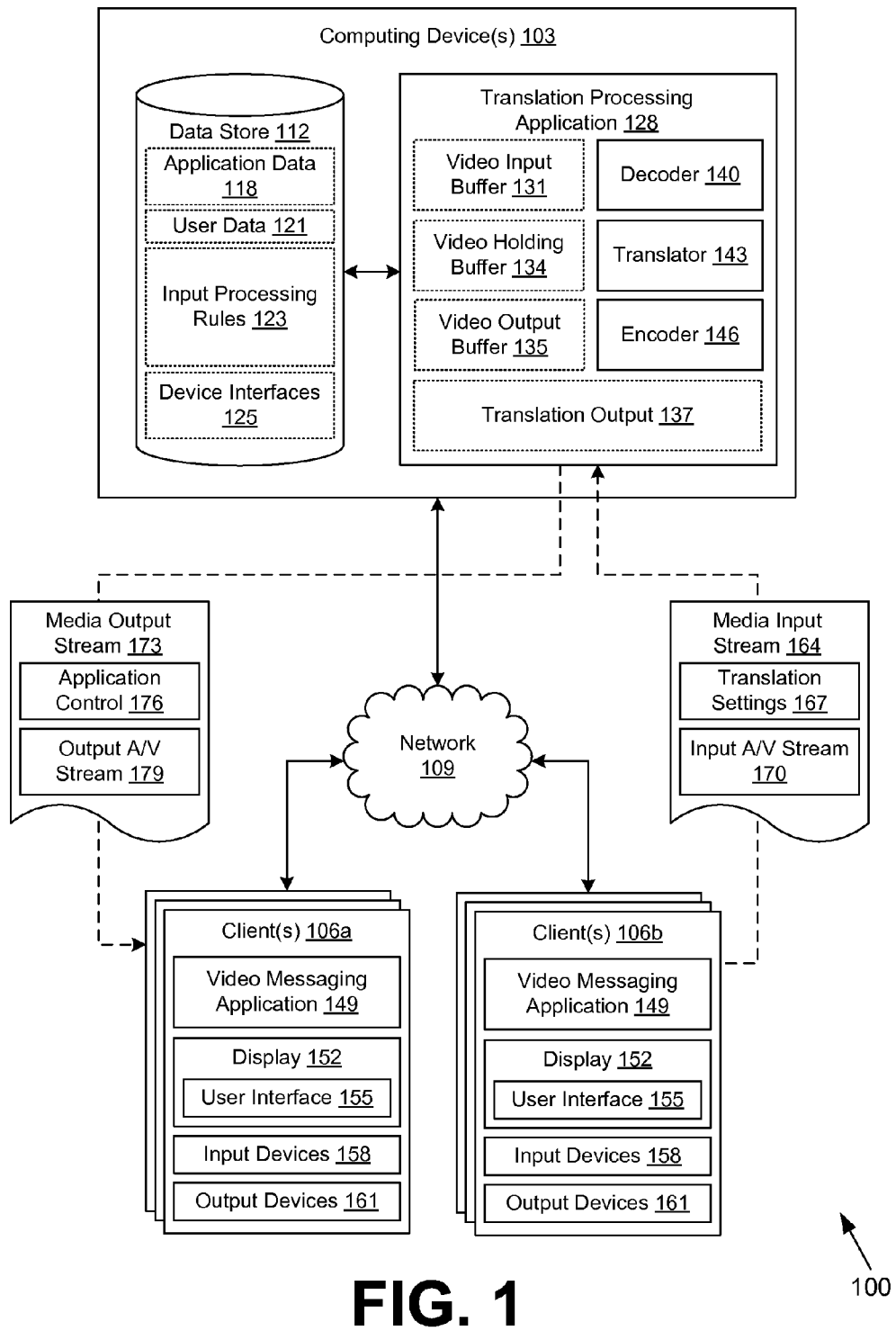
FIG. 1 is a drawing of a networked environment according to various embodiments of the present disclosure.

With reference to FIG. 1, shown is a networked environment 100 according to various embodiments. The networked environment 100 includes a computing device 103 in data communication with one or more clients 106 via a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include a translation processing application 128 and other applications, services, processes, systems, engines, or functionality not discussed in detail herein. The translation processing application 128 includes, for example, a video input buffer 131, video holding buffer 134, video output buffer 135, translation output 137, decoder 140, translator 143, encoder 146, and potentially other subcomponents or functionality not discussed in detail herein. The translation processing application 128 is executed in order to detect and translate speech. For example, the translation processing application 128 may place packets of an input audio/video (A/V) stream 170 in video input buffer 131 to await decoding, translation, and encoding. The translation processing application 128 may output encoded A/V signal comprising the original visual component, with a delay imposed, and a translation output as will be described.

The data stored in the data store 112 includes, for example, application data 118, user data 121, input processing rules 123, device interfaces 125, and potentially other data. Application data 118 may include, for example, application settings, translation settings, user-specific settings, and/or any other data that may be used to describe or otherwise relate to the application. User data 121 may include, for example, user-specific application settings, translation settings, geographic locations, messaging application user name, language preferences, phone numbers, and/or any other information that may be associated with a user.

Input processing rules 123 may include, for example, settings or restraints on language translation, language translation algorithms, language translation rules, predefined language translation thresholds, and/or any other information that may be associated with input processing. Device interfaces 125 may include data relating to a display, a user interface, and/or any other data pertaining to an interface.

Each of the clients 106*a/b* is representative of a plurality of client devices that may be coupled to the network 109. Each client 106*a/b* may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

Each client 106*a/b* may be configured to execute various video messaging applications 149 such as a video conferencing application, a video voicemail application, and/or other applications. Video messaging applications 149 may be rendered by a browser, for example, or may be separate from a browser. Video messaging applications 149 may be executed, for example, to access and render user interfaces 155 and video streams on the display 152. The display 152 may comprise, for example, one or more devices such as cathode ray tubes (CRTs), liquid crystal display (LCD) screens, gas plasma-based flat panel displays, LCD projectors, or other types of display devices, etc.

The input devices 158 may be executed to generate a video data stream. The input devices 158 may comprise, for example, a microphone, a keyboard, a video camera, a web-camera, and/or any other input device. The output devices 161 may be executed to render a video and/or audio data stream. The output devices 161 may comprise, for example, speaker(s), lights, and/or any other output device beyond the display 152.

Next, a general description of the operation of the various components of the networked environment 100 is provided. To begin, a user may participate in a video conference via video messaging application 149. An input device 158, such as a camera and a microphone, may capture audio and/or video data corresponding to the participant's activity and speech. The audio and/or video data is communicated to the translation processing application 128 as an input A/V stream 170 via media input stream 164. The desired translation language may be communicated via media input stream 164 as translation settings 167. The audio and/or video data may be placed in video input buffer 131 to await processing. The translation processing application 128 may begin processing the data in video input buffer 131 in a first in, first out (FIFO) method.

Processing the data residing in video input buffer 131 may involve decoding the A/V data to separate the visual component from the audio component in the decoder 140. The visual component may be stored in video holding buffer 134 while the audio component is translated. Alternatively, the A/V signal may be stored in video input buffer 131 and/or video holding buffer 134 where the decoder 140 merely obtains a copy of the audio component to translate. The audio component may be processed by the translator 143 to convert the audio data to text data using, for example, a speech recognition algorithm. The text data reflects what was spoken by the user in the user's spoken language. Via translator 143, the text data may be translated to other text data comprising a second language. Translator 143 may further comprise an algorithm that estimates the accuracy of the translation. The accuracy of the translation may also be considered a confidence level calculated by translation processing application 128 that the translation is correct.

According to various embodiments, the translation output 137 may comprise audio, text, or any other form embodying speech in a second language. The translated text data may be stored as translation output 137 to provide a written log of the communication and/or to later encode the video with subtitles via the encoder 146. The text data comprising the translation may be converted to audio via the encoder 146 by, for example, employing a text-to-speech algorithm. The translated audio data may be stored as translation output 137 to provide an audio log of the communication and/or later encode the video with the translation audio via the encoder 146.

The encoder 146 is configured to combine the translation output 137 with the data residing in the video holding buffer 134. In one embodiment, the encoder 146 may combine the video residing in the video holding buffer 134 with the translated text data as subtitles by synchronizing the text translation output 137 with the previously separated visual component of the video data. In another embodiment, the encoder 146 may combine the video residing in the video holding buffer 134 with the translated audio rendering by synchronizing the audio rendering with the previously separated visual component of the video data. In another embodiment, the encoder 146 may combine the translated text data with the A/V signal residing in the video holding buffer 134 as subtitles by synchronizing the text translation output 137 with the visual component of the A/V signal. The A/V output of the encoder 146 may be stored in video output buffer 135.

Synchronizing the visual component of the video data with the translation output may comprise speeding up or slowing down the play speed of the video data and/or the play speed of translation output 137. For example, the play speed of a video segment depicting a participant speaking in a first language may be adjusted to synchronize the playback of the translation output 137 of a second language with the video segment.

In one embodiment, the synchronization occurs through the encoder 146 in the translation processing application 128 by combining the visual component of the video data with the translation output 137 in computing device(s) 103. For example, the translation processing application 128 may synchronize the audio and video components and encode them to create one MPEG-4 file to transmit to the client(s) 106 via output A/V stream 179. In another embodiment, the visual component of the video data and the translation output 137 may be left separate in the translation processing application 128. In this embodiment, the video messaging application 149 may initiate synchronous playback of the visual component and the translation output 137 in computing device(s) 106. For example, the audio component may be encoded as a WAV file and the video component may be encoded as an MPEG-4 file, both sent to client(s) 106 via media output stream 173 and output A/V stream 179. The video messaging application 149 may play the files simultaneously to have the same effect as the previous embodiment.

The encoded video residing in video output buffer 135 comprising the translation output 137 is transmitted to client(s) 106 via media output stream 173. Application control 176 provides data corresponding to initiating playback of output A/V stream 179 in video messaging application 149. Additionally, application control 176 may comprise data that controls indicators in the video messaging application 149 that may display the estimated accuracy of the translation and/or indicator icons corresponding to whether a translation is being generated by the client sending the output A/V stream 179.

Figure 2:
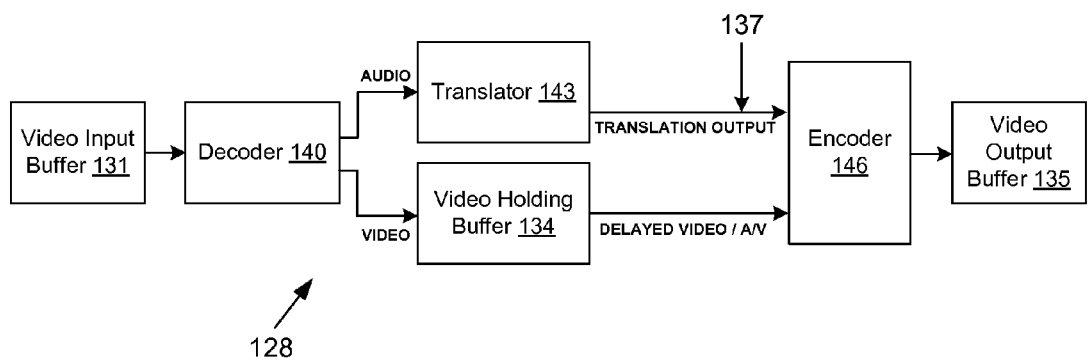
FIG. 2 is a functional block diagram illustrating one example of functionality implemented as portions of the translation processing application executed in a computing device in the networked environment of FIG. 1 according to various embodiments of the present disclosure.

Referring next to FIG. 2, shown is a functional block diagram that provides one example of the operation of a portion of translation processing application 128 according to various embodiments. It is understood that the functional block diagram of FIG. 2 provides merely an example of the many different types of functional arrangements that may be employed to implement the operation of the portion of the language translation as described herein.

A/V data is initially stored in video input buffer 131 and is accessed by decoder 140 to separate the audio component from the video component, or at least obtain a copy of the audio component. Frames of the video component are then stored in video holding buffer 134. Alternatively, if the decoder 140 obtains a copy of the audio component, the A/V signal may be stored in video holding buffer 134. The audio component then is provided to translator 143 where the audio comprising a first language is converted to text comprising the first language. Further, in translator 143, the text comprising the first language may be translated to text comprising a second, translated language shown as translation output 137. Also, translator 143 may be further configured to render the text comprising a second language into an audio version of the translation as audio translation output 137.

The video component or A/V signal stored in video holding buffer 134 is accessed by the encoder along with the translation output 137. The encoder 146 may then combine translation output 137 with either the previously separated video component or the A/V signal to create a combined video file stored in video output buffer 135. By combining the translation output 137 with the video in video holding buffer 134, a delay may be imposed in the video or A/V signal that is equivalent to the time elapsed in generating the translation output 137.

Figure 3:
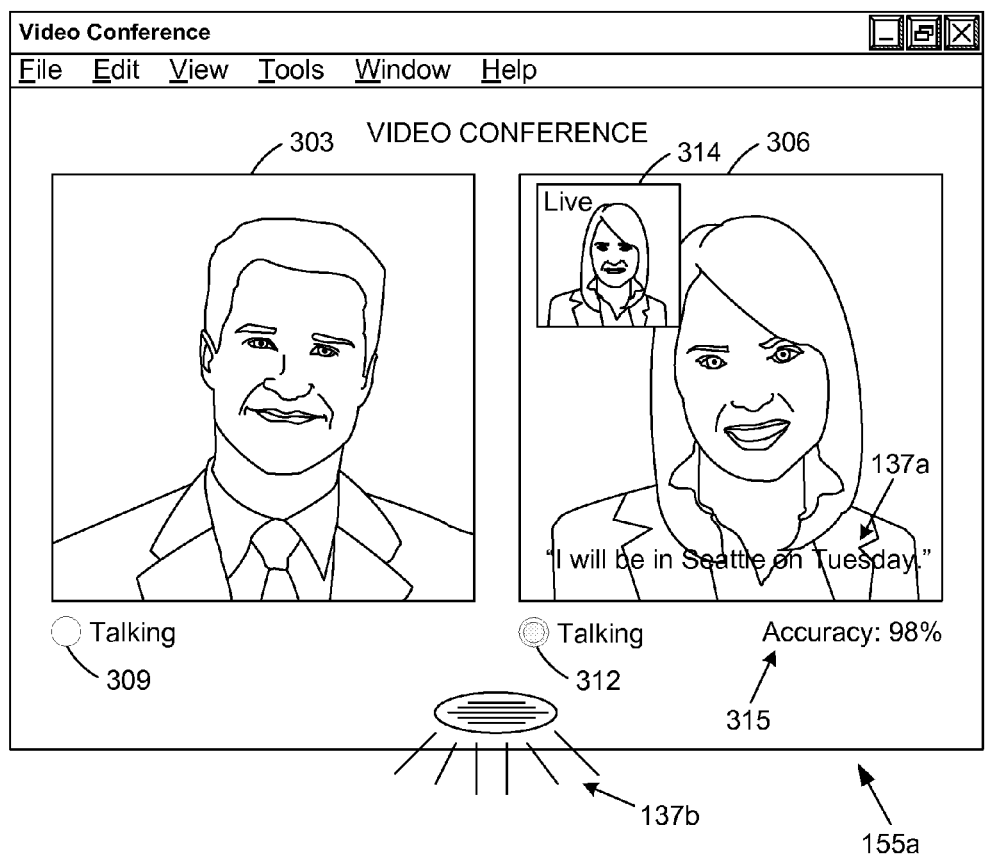
FIGS. 3-4 are drawings of examples of user interfaces rendered by a client in the networked environment of FIG. 1 according to various embodiments of the present disclosure.

Referring next to FIG. 3, shown is a drawing of an example of a user interface 155*a* rendered by a client 106 (FIG. 1) in the networked environment 100 (FIG. 1) according to various embodiments of the present disclosure. In particular, FIG. 3 depicts an example of an ongoing video conference implemented by the video messaging application 149 (FIG. 1). The video messaging application 149 depicts a view of two live video renderings 303 and 306 of two video messaging participants. Although depicted with only two participants, it is understood that more participants can take part in the video conference.

Indicator icons 309 and 312 are shown below the video renderings to facilitate the taking of turns speaking in the video conference, which may prevent two users from talking simultaneously. In this example, indicator icons 309 and 312 are speech indicators, which may turn on or illuminate when a user is speaking and/or the translation processing application 128 (FIG. 1) is generating a translation. An optional live video rendering 314 of the user who is speaking without an imposed delay may be shown to further assist other users in determining whether or not a person is speaking.

An accuracy indicator 315 is shown below the video rendering that indicates an accuracy of the currently rendered translation output 137. It is understood that the accuracy indicator 315 can frequently change according to an estimated accuracy of the playing translation output 137 at any given time. Text translation output 137 is depicted as subtitles. Audio translation output 137 is rendered by the speaker as audio. In one embodiment, translation output 137 may be played on top of the original speech simultaneously, with the volume of the original speech lessened to a certain degree. In another embodiment, the original video may be played with no audio. In this embodiment the video is encoded with the text translation output 137 as subtitles.

Figure 4:
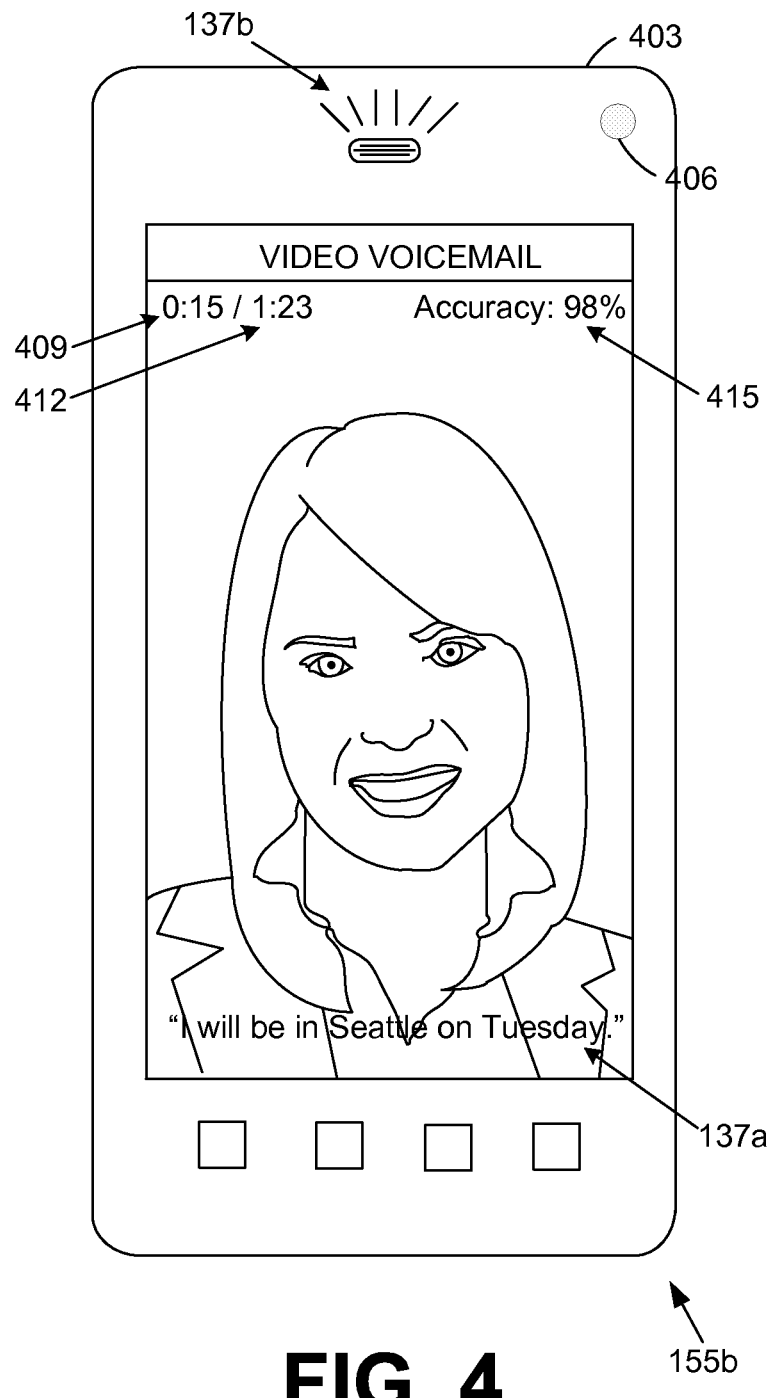

Turning now to FIG. 4, shown is a drawing of an example of user interface 155*b* rendered by a client 106 (FIG. 1). In particular, FIG. 4 depicts an example of a video voicemail in a video messaging application 149 (FIG. 1) running on a mobile device 403. A current play time 409 is shown next to a total play time 412 corresponding to a total duration of the video message. An indicator light 406 is shown that may correspond to a physical light in the hardware of the mobile device. In the event of a video conference via the video messaging application 149, the indicator light 406 may be enabled or disabled when a translation is being generated. An accuracy indicator 415 is shown simultaneously with the video message that includes the translation output 137. It is understood that the accuracy indicator 415 can frequently change according to an estimated accuracy of the rendered translation output 137 at any given moment. Audio translation output 137 may be played on top of the original speech simultaneously, with the volume of original speech lessened to a certain degree.

Figure 5:
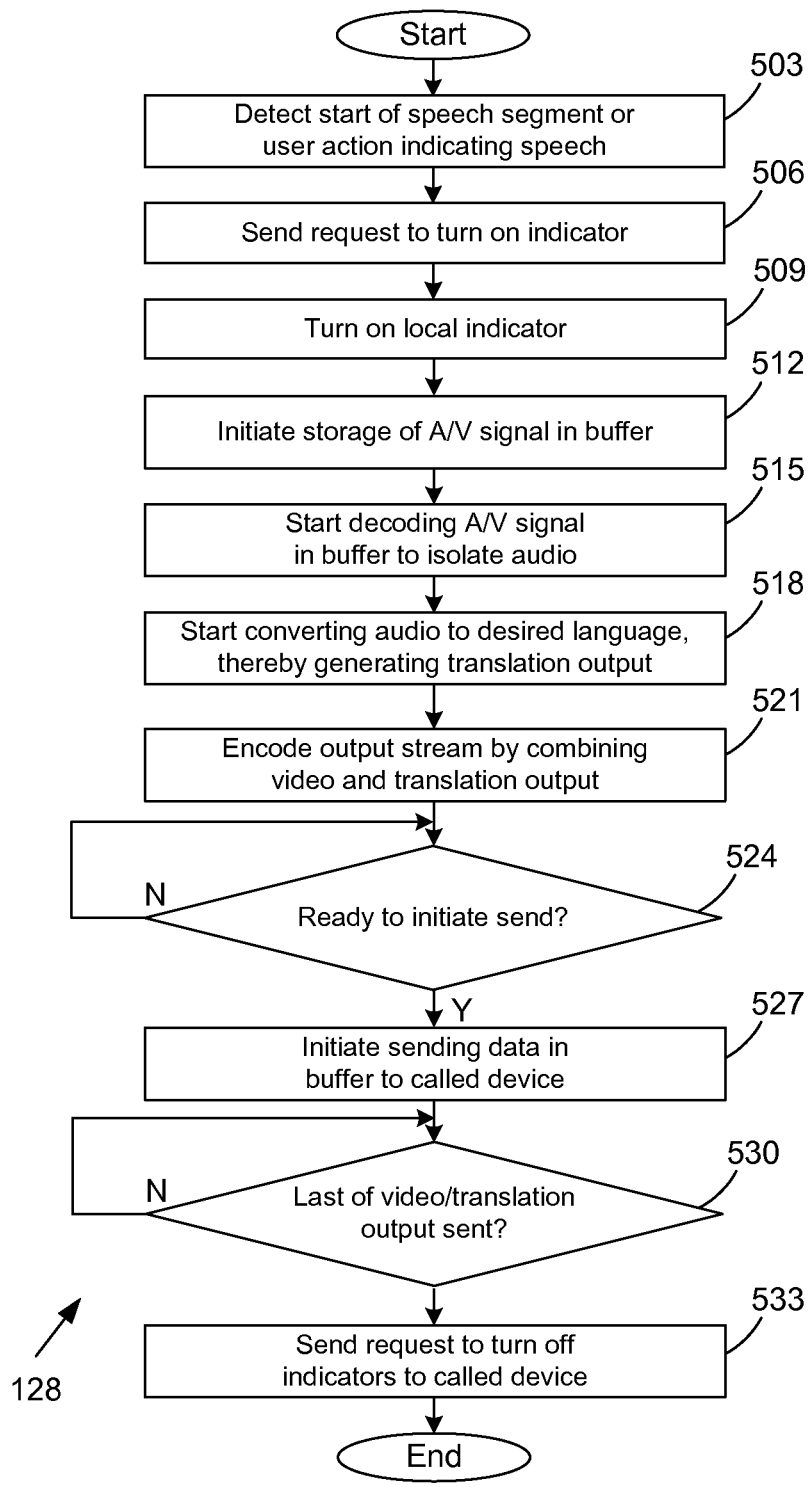
FIG. 5 is a flowchart illustrating one example of functionality implemented as portions of a video translation application executed in a computing device in the networked environment of FIG. 1 according to various embodiments of the present disclosure.

Referring next to FIG. 5, shown is a flowchart that provides one example of the operation of a portion of translation processing application 128 according to various embodiments. It is understood that the flowchart of FIG. 5 provides merely an example of the many different types of functional arrangements that may be employed to implement the operation of the portion of the language translation as described herein. As an alternative, the flowchart of FIG. 5 may be viewed as depicting an example of steps of a method implemented in the computing device 103 (FIG. 1) according to one or more embodiments.

Beginning with box 503, the translation processing application 128 detects either the start of a speech segment or an action by the user that indicates the start of the speech. In one embodiment, this may be triggered by a user pressing a button. In another embodiment, this may be triggered using a visual detection algorithm that detects when a user moves his or her lips in a manner that indicates speech is being produced. In another embodiment, this may be triggered by a noticeable change in an audio signal.

In box 506, the translation processing application 128 then sends a signal to the receiving client 106 (FIG. 1) to turn on an indicator indicating that a user has started talking. For example, the indicator may be an icon in the user interface 155 (FIG. 1) such as indicator icon 309 or 312 (FIG. 3). In another embodiment, the indicator may be an output device 161 (FIG. 1) such as indicator light 406 (FIG. 4) on a mobile device. In another embodiment, a sound may be played in place of or simultaneously with the indicator to indicate that another user is speaking. In box 509, a local indicator is turned on, similar to those discussed above, to indicate that a user is speaking and/or the translation processing application 128 is currently generating a translation.

Next, in box 512, storage of A/V signal is initiated in video input buffer 131 (FIG. 1). In box 515, decoding is initiated for the audio and/or video data residing in video input buffer 131 to isolate the speech. For example, a participant in a video messaging conference states, "I will be in Seattle on Tuesday." An audio/video segment of the participant's statement resides in the video input buffer 131. The translation processing application 128 will separate the visual component of the video from the audio component or will obtain a copy of the audio compound. The translation processing application 128 then converts the audio component to a textual representation of what was said.

Next, in box 518, the speech is converted to a desired language. In one embodiment, the speech is converted to a translation output 137 (FIG. 1) comprising a language identified by a participant. For example, a video messaging application 149 (FIG. 1) may have a setting that permits a participant to select a desired language of translation. In another embodiment, the audio is converted to a language detected from a setting provided by the speaking participant. In another embodiment, a language may be detected from a previous communication. The translation output 137 may comprise text, audio, or both as described above.

In box 521, the translation output 137 is encoded with the video in the holding buffer 134 (FIG. 1). A delay is imposed to give the perception that the speech is live when it is, in fact, slightly delayed to account for any noticeable time that may elapse during the translation. In one embodiment, a delay is imposed based on the amount of time the video frames sit in the video holding buffer 134 that is needed to finish the translation. To this end, a buffer may be used to temporarily store the translation output 137 until accessed by the encoder 146 (FIG. 1). In another embodiment, a delay in the video may be inherently imposed by encoding the audio with the previously separated video segment that has been residing in a holding buffer. In another embodiment, the delay may be based at least in part on a predefined threshold. For example, the average computation time of English to Mandarin translation in a particular computing device may be calculated and applied as a threshold in the computation of the delay.

In box 524, the translation processing application 128 determines whether enough speech has been translated to generate the output A/V stream 179 (FIG. 1). For example, completion of a translation comprising a full word, phrase, or sentence may be necessary before initiating a transfer to avoid discontinuity in speech segments.

If the translation processing application 128 determines enough speech has been translated, then it moves to box 527 where the sending of the video combined with the translation output 137 to a called device is initiated. For example, computing device 103 may begin sending A/V data residing in video output buffer 135 (FIG. 1) to another participant who is using a separate computing device. In box 530, it is determined whether the user has finished speaking. It is understood that as a participant is speaking, more speech may be added to the buffer of speech to be translated. Further, it is understood that the sending of the translation may not be complete until all speech that the participant has made has been translated. Finally, in box 533, a request is sent to the called device to turn off the indicator. It is understood that this process may repeat itself many times over the course of a video messaging conference.

Figure 6:
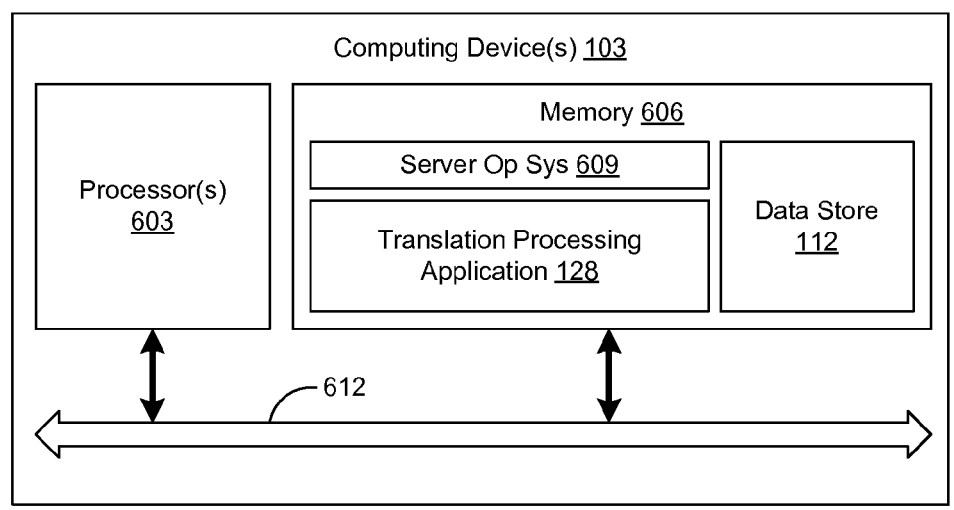
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 612. To this end, the computing device 103 may comprise, for example, at least one server computer or like device. The local interface 612 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the translation processing application 128, the server operating system 609, and potentially other applications. Also stored in the memory 606 may be a data store 112 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 612 may be an appropriate network 109 (FIG. 1) that facilitates communication between any two of the multiple processors 603, between any processor 603 and any of the memories 606, or between any two of the memories 606, etc. The local interface 612 may comprise additional systems designed to coordinate this communication, including, for example, performing load balancing. The processor 603 may be of electrical or of some other available construction.

Although the translation processing application 128 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the translation processing application 128. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the translation processing application 128, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that generates a data stream that comprises an audio signal embodying a first language and a video signal;
    code that transmits a first signal to a receiving computing device to turn on a first indicator that indicates an impending data stream;
    code that translates the audio signal embodying the first language into a translation output embodying a second language;
    code that adjusts a play speed of the translation output according to a duration of a video component of the video signal;
    code that imposes a delay in the video signal, the delay depending at least in part upon a time needed to perform a translation;
    code that associates the translation output with the video signal;
    code that determines whether a predefined amount of the audio signal embodying the first language has been translated to the translation output embodying the second language before a transmission to avoid a discontinuity in a plurality of speech segments;
    code that transmits a second signal to the receiving computing device to update a second indicator that displays an estimated accuracy of the translation; and
    code that transmits the video signal with the translation output to the receiving computing device responsive to the predefined amount of the audio signal embodying the first language being translated.

2. The non-transitory computer-readable medium of claim 1, wherein the audio signal comprises a first audio signal, and the translation output comprises a second audio signal.

3. The non-transitory computer-readable medium of claim 1, wherein the translation output comprises the audio signal coupled with text.

4. A system, comprising:
    at least one computing device; and
    a translation application executable in the at least one computing device, the translation application comprising:
        logic that receives a data stream that comprises an audio signal embodying a first language and a video signal from a transmitting computing device;
        logic that translates the audio signal embodying the first language into a translation output embodying a second language;
        logic that imposes a delay in the video signal, the delay depending upon a time needed to perform a translation;

logic that associates the translation output with the video signal;

logic that determines whether a predefined amount of the audio signal embodying the first language has been translated to the translation output embodying the second language; and logic that transmits the video signal with the translation output to a receiving computing device responsive to the predefined amount of the audio signal embodying the first language being translated.

5. The system of claim 4, further comprising logic that transmits a signal to the receiving computing device to turn on an indicator that indicates a sender is generating the data stream.

6. The system of claim 4, further comprising logic that transmits a signal to the receiving computing device to update an indicator that indicates an estimated accuracy of the translation.

7. The system of claim 4, further comprising logic that adjusts a play speed of the translation output.

8. The system of claim 4, wherein the audio signal comprises a first audio signal, and the translation output comprises a second audio signal.

9. The system of claim 4, wherein the translation output comprises the audio signal coupled with an amount of text.

10. The system of claim 4, wherein the delay is based at least in part on a predefined threshold of time estimated to perform the translation.

11. The system of claim 4, wherein associating the translation output with the video signal comprises synchronizing the translation output with the video signal.

12. A method, comprising:

receiving, by at least one computing device, a data stream that comprises an audio signal and a video signal from a transmitting computing device, the audio signal embodying a first language;

translating, by the at least one computing device, the audio signal embodying the first language into a translation output embodying a second language;

imposing, by the at least one computing device, a delay in the video signal, the delay depending upon a time needed to perform a translation;

associating, by the at least one computing device, the translation output with the video signal;

determining, by the at least one computing device, whether a predefined amount of the audio signal embodying the first language has been translated to the translation output embodying the second language; and transmitting, by the at least one computing device, the video signal with the translation output to a receiving computing device responsive to the predefined amount of the audio signal embodying the first language being translated.

13. The method of claim 12, further comprising transmitting, by the at least one computing device, a signal to the receiving computing device to turn on an indicator that indicates a sender is generating the data stream.

14. The method of claim 12, further comprising transmitting, by the at least one computing device, a signal to the receiving computing device to update an indicator that indicates an estimated accuracy of the translation.

15. The method of claim 12, further comprising adjusting, by the at least one computing device, a play speed of the translation output.

16. The method of claim 12, wherein the audio signal comprises a first audio signal, and the translation output comprises a second audio signal.

17. The method of claim 12, wherein the translation output comprises the audio signal coupled with an amount of text.

18. The method of claim 12, wherein the delay is based at least in part on a predefined threshold of time estimated to perform the translation.

19. The method of claim 12, wherein associating the translation output with the video signal comprises synchronizing the translation output with the video signal.

\* \* \* \* \*